Nov. 23, 1965  D. W. CHAMBERLIN  3,219,169
ARTICLE DETECTING DEVICE
Filed Aug. 13, 1963  3 Sheets-Sheet 1
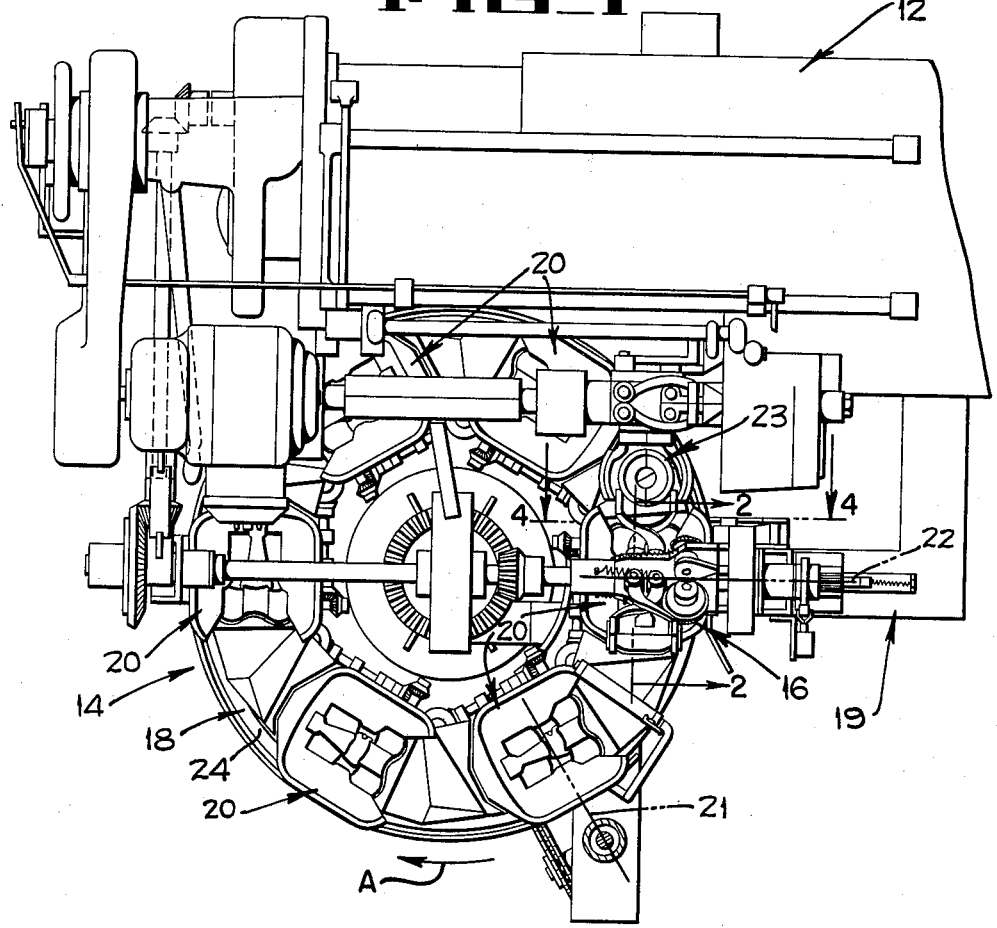
FIG_1
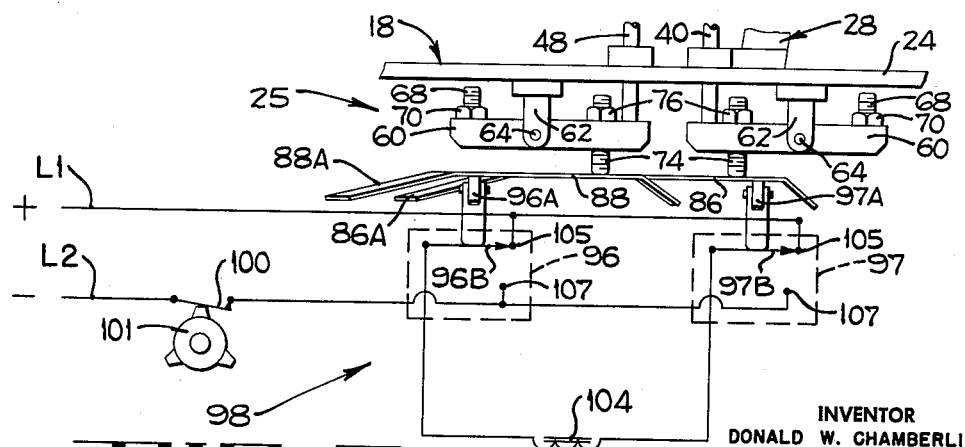
FIG_6
INVENTOR
DONALD W. CHAMBERLIN
BY Hans F. Hoffmeister
ATTORNEY

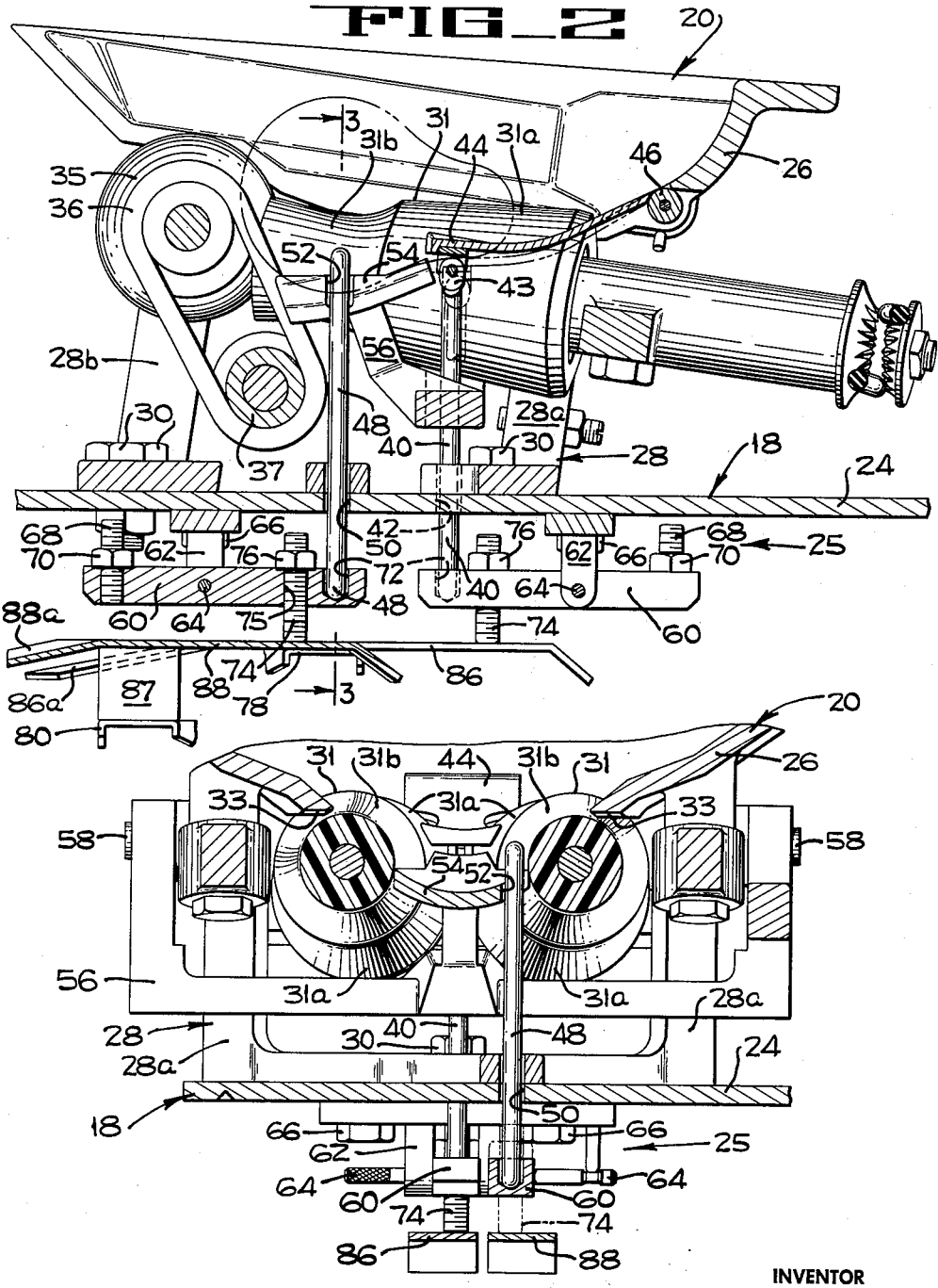

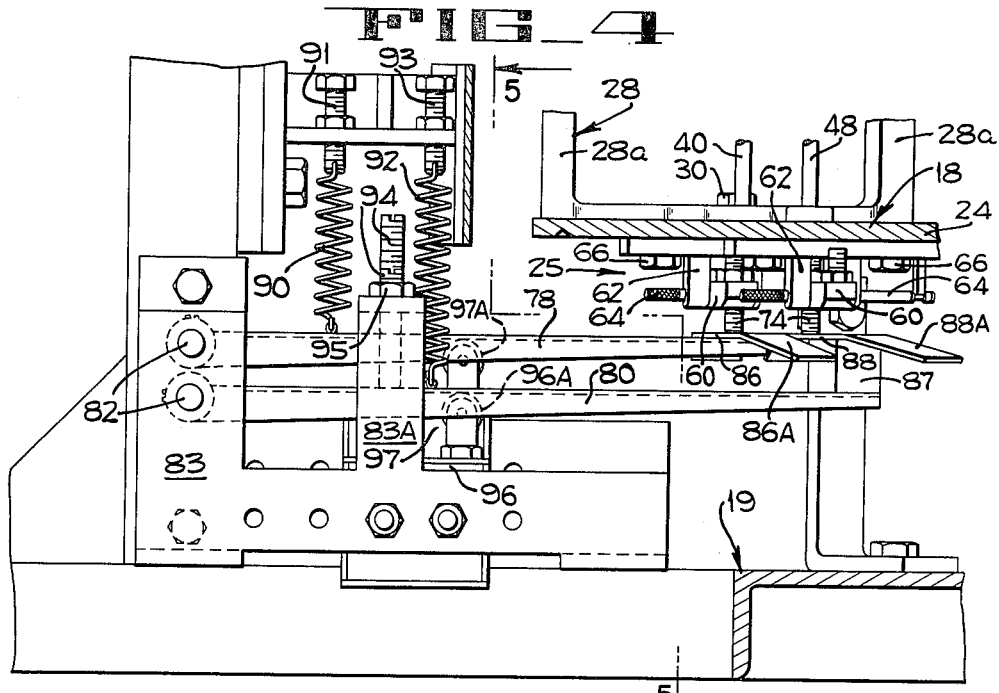
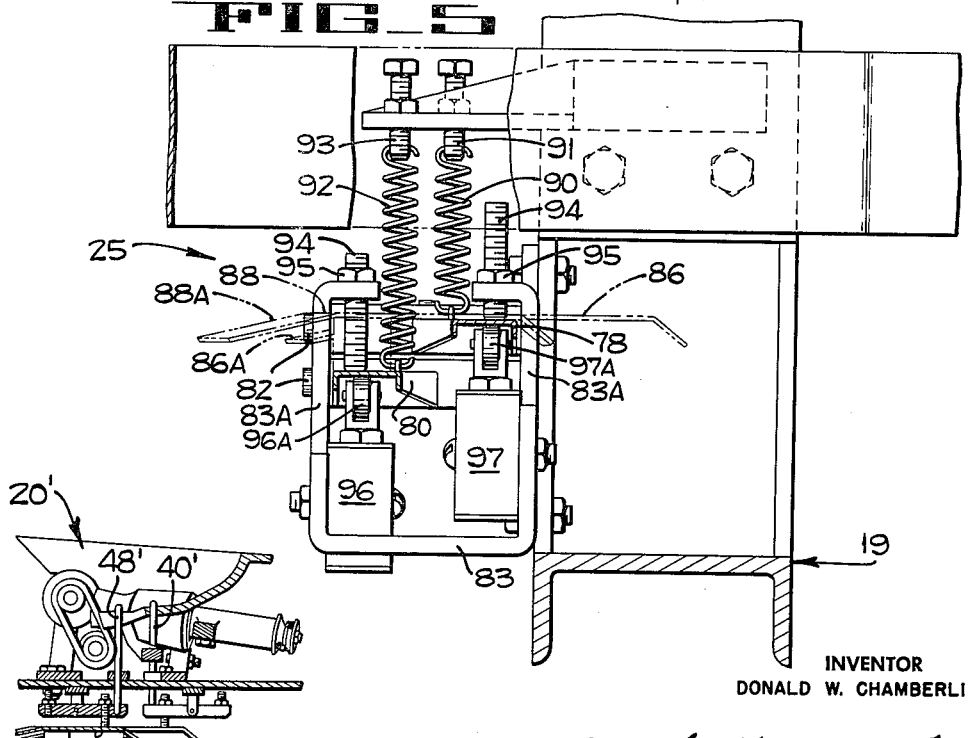

United States Patent Office 3,219,169
Patented Nov. 23, 1965

3,219,169
ARTICLE DETECTING DEVICE
Donald W. Chamberlin, Los Gatos, Calif., assignor to FMC Corporation, San Jose, Calif., a corporation of Delaware
Filed Aug. 13, 1963, Ser. No. 301,768
18 Claims. (Cl. 198—33)

The present invention pertains to devices for detecting the position of articles in a carrier and, more particularly, relates to a device for detecting the position of fruit, such as pears, in an orienting mechanism and for actuating a reject mechanism to cause rejection of unoriented fruit.

An object of the present invention is to provide an improved article detecting device.

Another object is to provide a detection device that is capable of distinguishing between a properly oriented fruit in a carrier and an improperly oriented fruit.

Another object of this invention is to provide an improved device for detecting the position of fruit in a feed mechanism and rejecting fruit that is improperly oriented.

Another object is to provide an improved control circuit for an article detecting and rejecting mechanism.

These and other objects and advantages of the present invention will become apparent from the following description and from the accompanying drawings, in which:

FIGURE 1 is a top schematic plan of the orienting mechanism incorporating the position-detecting device of the present invention and employed in combination with a fruit preparation machine, which is fragmentarily illustrated.

FIGURE 2 is an enlarged longitudinal section taken on line 2—2 of FIGURE 1.

FIGURE 3 is a vertical section taken on line 3—3 of FIGURE 2.

FIGURE 4 is a fragmentary vertical section of the orienting mechanism at the transfer station, the view being taken substantially on line 4—4 of FIG. 1.

FIGURE 5 is a section on line 5—5 of FIGURE 4.

FIGURE 6 is a diagram of an electrical circuit, certain parts of the detecting mechanism being shown in elevation.

FIGURE 7 is a schematic showing of a second embodiment of the article detecting mechanism of the present invention.

The embodiment of the position-detecting device chosen for illustration of the present invention is shown as associated with an orienting mechanism 14 (FIG. 1), and with a transfer mechanism 16 which removes fruit from the orienting mechanism and delivers it to a fruit preparation machine 12. The orienting mechanism 14 comprises a turret 18 that is rotatably mounted on a frame 19 and movable in the direction of arrow A (FIGURE 1) by means not shown. A plurality of fruit carriers 20, are disposed in equally spaced relation around the top surface of the turret 18 to which they are secured. During the movement of the turret 18, each of the fruit carriers 20 receives a piece of fruit at a receiving station, indicated by phantom line 21. The carrier conveys the fruit to a discharge station 22 at which the transfer mechanism 16 is located. The fruit within each carrier 20 at the transfer station 22 is grasped by the transfer mechanism 16 and is delivered either to a reject chute (not shown) or to one of a plurality of carrier cups 23 of the fruit preparation machine 12. To assure proper preparation of the fruit, such as pears in this instance, the pear must be properly oriented in its fruit carrier 20 with the stem end facing forwardly in the carrier 20 and with the stem blossom axis of the pear disposed substantially tangent to the path of circular movement of the carrier. A detection mechanism 25 (FIG. 2) of the present invention is associated with each fruit carrier 20 (FIGS. 2–3) and is effective to detect the presence of an oriented pear or an unoriented pear or the absence of a pear within the fruit carrier 20. If the pear is not properly oriented when it reaches the transfer station 22, the detection mechanism conditions the transfer mechanism 16 so that the pear will be dropped onto the reject chute before the transfer mechanism arrives at the point at which it transfers fruit to the cup 23 of the fruit preparation machine 12. The transfer mechanism 16, the turret 18, the orienting mechanism 14, and the reject mechanism, and their control apparatus are disclosed in the pending application of Donald W. Chamberlin, filed October 10, 1961, now U.S. Patent No. 3,137,383 which issued June 16, 1964 to the assignee of this invention, and reference may be had to said patent for a complete disclosure of these and other mechanisms not described in detail herein.

Referring to FIGURES 2 and 3, the detection mechanism 25 of the present invention is illustrated in association with a fruit carrier 20 which is securely supported on a large base disc 24 of the turret 18. It will be understood that the several fruit carriers 20 are identical in construction and operation and, accordingly, a description of one carrier and its associated mechanism will suffice for all carriers.

Briefly, the fruit carrier 20 comprises a dish-like member 26 that is securely mounted on a one-piece frame 28, partially shown, which has forward and rearward members 28a and 28b, respectively, that are secured to the turret 18 by a series of cap screws and bolts 30. Two elongate orienting rollers 31 are journalled for rotation in the frame 28 and extend longitudinally of the frame 28 along opposite sides of the carrier. Each roller has a frusto conical portion 31a and a concave rear portion 31b, the portion 31a of each roller extending up through an opening 33 (FIG. 3) in the carrier and the rear portion 31b underlying a central portion of the opening. A rear orienting roller 35 extends transversely of the carrier and closes the rear portion of the opening 33 in the bottom of the carrier. An orienting belt 36 is trained over the central portion of the rear roller 35 and over a guide roller 37 that is journalled for rotation in the frame 28. The drive mechanism for these orienting rollers and the manner in which they manipulate the fruit to orient it is fully described in the above mentioned Chamberlin patent. To understand the present invention, it is sufficient to note the rollers 31 and 35 and the belt 36 define a pear-shaped cavity having a rear portion particularly designed to receive the bulb end of a pear and a forward portion for receiving the stem end of the pear. Also, it will be noted that the joint action of the two orienting rollers 31, the roller 35, and the belt 36 is to orient the fruit so that the stem end is foremost in the carrier and the stem-blossom axis of the pear is tangent to the path of the turret 18. An oriented pear is shown in phantom lines in FIGURE 2.

A detecting device of the present invention is associated with each fruit carrier 20 and comprises one vertically movable detector pin 40 which passes through an opening 42 in the turret 18 and is pivotally connected at one end 43 with one end of a nose stop 44. The nose stop 44 is disposed between the orienting rollers 31 and is pivotally connected at one end 46 to the carrier. A second vertically movable detector pin 48 extends upwardly through a similar opening 50 in the turret 18 and passes through an opening 52 in a bridge member 54 that is located within the pocket between the nose stop 44 and the belt 36 and between the two side orienting rollers 31. The extent to which the detector pin 48 normally projects into the pocket of the carrier is shown in FIG. 2. The bridge member 54 is an integral part of a U-shaped member 56 (FIG. 3) that extends transversely of the carrier and is pivotally mounted on short shafts 58 (FIG. 3) projecting from opposite sides of the one piece frame 28. Since the bridge member 54 is thus mounted for limited oscillatory movement, the opening 52 must be dimensioned to permit free longitudinal movement of the detector pin 48 therethrough in any pivoted position of the member.

Each of the two pins 40 and 48 projects below the turret 18 for connection at its lower end to one of two identical rocker arms 60. More specifically, each rocker arm 60 is pivotally mounted intermediate its ends in a yoke 62 by means of a transverse elongate pin 64 extending through aligned openings in the yoke 62 and in the rocker arm 60. Each yoke 62 is secured to the turret 18 by cap screws 66. An adjustable threaded stud 68 is secured in a threaded opening at one end of each rocker arm 60 by the lock nut 70. The extent to which the stud 68 projects beyond the rocker arm 60 limits counter-clockwise pivotal movement of the rocker arm 60. The other end of each rocker arm 60 includes a socket 72 which opens upwardly toward the turret 18 for receiving the lower end of the longitudinally movable detector pin 40 or pin 48, as the case may be. Between the opening 72 and the yoke 62, an additional threaded stud 74 is disposed in a threaded opening 75 in each pivotally mounted rocker arm 60. A lock nut 76 secures the stud 74 in an adjusted position. Each adjustable stud 74 projects downwardly from the rocker arm 60 for engagement with the upper surface of a switch actuating mechanism that is located at the transfer station 22 and will be presently described.

The positions at which the two detector pins 40 and 48 are shown in FIGS. 2 and 3 are the positions they assume when the carrier 20 is empty. A properly oriented pear, indicated in phantom lines in FIGURE 2, will have its stem end engaging the nose stop 44 and forcing the stop downwardly to the stop position shown by the phantom lines. The blossom end of the pear, which is the large end, engages the end of the pin 48 and presses it downwardly to a position below the position shown in FIG. 2. When both pins 40 and 48 are depressed, the control system is so conditioned that no reject action takes place. If only one pin is depressed, the reject system will be activated, as will be explained presently. It should be noted here that the pin 48 is laterally offset relative to the longitudinal centerline of the carrier (FIG. 3). With this arrangement if the pear should come to rest in the carrier with its stem end facing directly rearwardly, the stem end will not depress the pin 48. Therefore, since the butt end will be depressing the nose stop, the reject mechanism will be activated.

The control system includes two laterally projecting switch-actuating levers 78 and 80 (FIG. 4), each of which is pivotally mounted at one end on a stud 82 projecting from a bracket 83 that is secured by bolts to the fixed support frame 19 of the orienting mechanism 14. The lever 78 has, at its free end, a cam 86 with an inclined forward surface 86A adapted to be engaged by the adjustable stud 74 that is associated with the detector pin 40 of each carrier. The other lever 80 has, at its free end, a vertical bracket 87 that carries a cam 88 whose upper forward surface 88A is adapted to be engaged by adjustable stud 74 associated with the detector pin 48. A coiled spring 90 is connected at one end to the support frame 19 by an adjustable bolt 91, at its other end, the spring is connected to a intermediate section of the lever 78. Similarly, a coiled spring 92 is connected at one end to the frame 19 by an adjustable bolt 93 and at the other end to an intermediate section of the lever 80. The springs 90 and 92, associated with the respective levers 78 and 80, bias them in an upward direction and each spring is of sufficient strength to maintain the associated lever in upper position if the detecting pin, with which the lever is operatively connected, is not being held down by a pear. If the pin is held down, the spring will yield when engaged by stud 74 and permit the associated lever to move downwardly to actuate a switch in a manner to be described presently. Two adjustable threaded studs 94 (FIG. 5), locked in position by lock nuts 95, are connected to the bracket 83 on upwardly extending arms 83A intermediate the ends of the bracket. The ends of each stud 94 act against the upper surface of one of the levers 78 or 80 to limit the extent of the upward bias of the respectively connected springs 90 or 92.

Two micro-switches 96 and 97 (FIG. 5) are separately bolted to the bracket 83 adjacent the arm 83A, the actuating arm of switch 96 having a roller 96A bearing against the undersurface of lever 80 and the actuating arm of switch 97 having a roller 97A bearing against the undersurface of lever 78.

The micro-switches 96 and 97 cooperate to control an electrical circuit 98, shown schematically in FIGURE 6, that is connected across lines L1 and L2 and include a timer switch 100 and a reject solenoid 104. Line L1 is connected to a contact 105 of each switch 96 and 97 that is normally closed by the associated switch arm 96B or 97B. The timer switch 100 is periodically moved to a closed position by a rotary cam 101 that constituted a part of the transfer mechanism 16 and is driven in timed relation with the turret as described in the afore-mentioned Chamberlin patent. Line L2 is connected to a normally open contact 107 of each switch 96 and 97. The reject solenoid 104 is connected to the switch contact arms 96B and 97B of the switches 96 and 97. The entire operation of the reject system will not be described herein, it being sufficient to note that the rotary cam 101 periodically actuates the timer switch 100 to indicate that the transfer arms of the transfer mechanism 16 have moved across the fruit dish 26 at the transfer station 22 and have grasped a pear therein, whether the pear was properly oriented or was improperly oriented. Furthermore, the reject solenoid 104 constitutes a part of the reject mechanism that cooperates with the transfer mechanism 16 such that when the reject solenoid 104 is energized, the reject mechanism is actuated to effect opening of the transfer arms for rejection of the pear at the reject station before it reaches the position at which it would have been transferred to the fruit preparation machine 12.

The position detector device of the present invention controls the transfer mechanism 16 in the following manner. After a pear has been fed into a fruit carrier 20 on the movable turret 18, by hand or by a feeding mechanism, it is manipulated jointly by the orienting rollers 31 and 35. By the time the fruit carrier 20 reaches the transfer station 22, the two detecting pins 40 and 48 have either been depressed or are still in their original raised position, and the action of the transfer mechanism in rejecting the pear or feeding it to the fruit preparation machine will depend on the position of the pins.

If the dish 26 is empty, the detecting pins 40 and 48 will be in their raised position. Accordingly, when the studs 74 engage the cam surfaces 86A and 88A, the upward force exerted by the springs 90 and 92 will not be overcome and neither switch 96 nor 97 will be actuated. Accordingly the reject solenoid is not energized, and the fruit transfer mechanism goes through its ordinary closing and opening sequence even though no fruit is available for transferring.

If a fruit is in the carrier and it is properly aligned as shown in FIG. 2, both detecting pins will be in their lowered position when the carrier reaches the transfer station. Under these conditions, the reject solenoid energizing circuit will still be open since the connection to line L1 is broken at contact 105 of each switch 96 and 97. Accordingly, the transfer mechanism will go through its normal opening and closing sequence and it will grip the properly oriented pear and transfer it to the fruit preparation machine.

If the fruit is improperly oriented, either the pin 40 or the pin 48 will be depressed, but not both of them. If pin 48 is depressed, a circuit will be completed from L1, through contact 105 of switch 97, reject solenoid 104, contact 107 of switch 96, and timing switch 100 to line L2. Accordingly, the reject solenoid 104 will cause the transfer mechanism to open and drop the gripped fruit onto the reject chute. If pin 40 is depressed, the switch 97 will be activated and a circuit will be completed from line L1, through contact 105 of switch 96, reject solenoid 104, contact 107 of switch 97 and timing switch 100 to line L2.

In FIG. 7 a second embodiment of the article detecting mechanism is illustrated. In this arrangement two detecting pins 40' and 48' project upwardly through suitable openings in the bottom wall or floor of a carrier 20'. It will be understood that the pins 40' and 48' are operatively connected in the control system in exactly the same way that the pins 40 and 48 of FIG. 2 are connected in the system, the only difference between the embodiment of FIG. 7 and that of FIG. 2 resides in the fact that the pin 40' extends through an opening in the carrier rather than being connected to a pivotally mounted nose stop. It will be evident that the orienting rollers of the carrier will move the pear to a position wherein the stem end will engage and depress the pin 40' to indicate that the stem end of the pear is properly oriented.

From the foregoing description, it will be apparent that the present invention provides a simple, effective mechanism for sensing and rejecting improperly oriented fruit. While the disclosed embodiments have been described as associated with a rotary turret, it will be evident that the detecting mechanism of the present invention could be used with fruit moving in other paths, such as straight line paths. Also, while the two detector pins 40 and 48 have been disclosed in association with particular orienting rollers, it is evident that they could be operatively associated with other aligning devices, it being necessary only that the pins be so located that both are depressed when the fruit is properly oriented, and only one pin is depressed when the fruit is not properly oriented.

It will be understood that further modifications and variations may be effected without departing from the present invention which is only limited by the scope and proper interpretation of the appended claims.

Having thus described my invention what I claim as new and desire to protect by Letters Patent is:

1. A device for detecting the orientation of an article comprising means providing an article support surface, a pair of detecting members having article contact surfaces at their upper ends and having portions projecting through said support surface, and mounted for vertical movement relative to the surface, an electric control circuit, and means responsive to the movement of at least one of said members to a lower position under the urging of a portion of an article resting thereon to partially close said control circuit.

2. A device for detecting the orientation of an article, comprising means providing an article support surface, a pair of detecting members having article contacting surfaces at their upper ends and having portions projecting through said support surface and mounted for vertical movement relative to said surface, an electric control circuit, and a pair of switches in said circuit, each switch having an actuator arranged to be actuated by one of said members incident to lowering movement of the member under the urging of an article disposed on said support surface.

3. A device for detecting the orientation of an article comprising means providing an article support surface, a pair of detecting members having article contact surfaces at their upper ends and having portions projecting through said support surface and mounted for vertical movement relative to the surface, an electric control circuit, and switch means responsive to the movement of at least one of said members to a lowered position under the urging of a portion of an article resting thereon to partially close said control circuit, said switch means being responsive to the movement of both members to a lowered position to prevent energization of said circuit.

4. A device for detecting the orientation of an article, comprising an article carrier having an article support surface, a pair of spaced detecting members mounted for vertical movement relative to said carrier, each member having an article abutment surface associated with its upper end, means for urging said detecting members upwardly to position the abutment surfaces in spaced relation above the article support surface, the spacing between said abutment surfaces being coordinated with the size and shape of an article so that an article having a predetermined orientation can span and rest on the upper ends of said abutment surfaces and move said members to a lowered position, an electric control circuit, and a pair of switches in said circuit, each switch having an actuator arranged to be actuated by one of said members incident to lowering movement of the member under the urging of an article disposed on said support surface.

5. A device for detecting the orientation of articles comprising a carrier having an article support surface, a pair of article detecting members mounted for vertical movement relative to said carrier, each member having an article abutment surface at its upper end, means for urging said detecting members upwardly to position said abutment surfaces in spaced relation above the support surface of said carrier to be engaged and moved to lowered position by an article in said carrier, a pair of electric switches mounted adjacent said carrier, each switch being associated with one of said detecting members and arranged to be actuated incident to lowering movement of the member, and a control circuit including said switches and arranged to be partially closed when one of said switches is actuated by its associated detecting member.

6. A device for detecting the orientation of articles comprising a carrier having an article support surface, a pair of article detecting members mounted for vertical movement relative to said carrier, each member having an article abutment surface at its upper end, means for urging of said detecting members upwardly to position said abutment surfaces in spaced relation above the article support surface of said carrier to be engaged and moved to lowered position by an article in said carrier, a pair of electric switches mounted adjacent said carrier, each switch being associated with one of said detecting members and arranged to be actuated incident to lowering movement of the member, and a control circuit including said switches and arranged to be partially closed when one of said switches is actuated by its associated detecting member.

7. In an article detecting and rejecting system of the type wherein an article is carried on a support surface in a carrier and is manipulated and moved toward an oriented position, and wherein an article gripping mechanism removes the article from the carrier and conveys it to either a reject station or a feed station, the improvement which comprises a pair of spaced article detecting pins mounted below the carrier, each pin having an article abutment surface associated with its upper end, means urging said pins upwardly relative to the carrier to move said abutment surfaces to a position spaced above the article support surface of said carrier, an electric control circuit operatively connected to the article gripping mechanism and arranged when energized to actuate said mechanism to release an article at the reject station, and means responsive to the lowering of one of said pins under the urging of an article in said carrier for preparing said circuit for energization.

8. A device for detecting the orientation of a pear comprising an article carrier having orienting means defining an elongate pear-shaped cavity, said cavity, including a rear, bulb end receiving portion and a forward stem-end receiving portion, an apertured plate underlying the bulb receiving portion of said cavity, a pivotally mounted stop member disposed at the stem receiving portion of said cavity, a first detecting pin projecting upwardly through the aperture in said apertured floor portion, a second detecting pin pivotally connected to said pivotally mounted floor portion, an electric control circuit, and means responsive to the movement of at least one of said pins to a lowered position under the urging of an article resting thereon to partially close said control circuit.

9. A device for detecting the orientation of articles comprising an article carrier having an apertured floor portion and a pivotally mounted floor portion, a first detecting pin projecting upwardly through the aperture in said apertured floor portion, a second detecting pin pivotally connected to said pivotally mounted floor portion, and control means responsive to the movement of at least one of said pins to a lowered position under the urging of an article resting thereon to perform a control operation on the article.

10. A device for detecting the orientation of a pear comprising an article carrier having orienting means defining an elongate pear-shaped cavity, said cavity including a rear, bulb end receiving portion and a forward stem-end receiving portion, an apertured plate underlying the bulb receiving portion of said cavity, a pivotally mounted stop member disposed at the stem receiving portion of said cavity, a first detecting pin pivotally connected to said pivotally mounted floor portion substantially on the longitudinal centerline of said elongate cavity, a second detecting pin projecting upwardly through the aperture in said apertured floor portion, said aperture being offset laterally from the longitudinal centerline of the cavity, an electric control circuit, and means responsive to the movement of at least one of said pins to a lowered position under the urging of an article resting thereon to partially close said control circuit.

11. A device for detecting the orientation of an article, comprising means providing an article support surface, a pair of spaced detecting pins projecting upwardly through said surface and being mounted for vertical movement relative to said surface, the spacing between the upper ends of said pins being coordinated with the size and shape of an article so that an article having a predetermined orientation can span and rest on the upper ends of said pins and move said pins to a lowered position, an electric control circuit, and a pair of switches in said circuit, each switch having an actuator arranged to be actuated by one of said pins incident to lowering movement of the member under the urging of an article disposed on said support surface.

12. A device for detecting the orientation of an article, comprising means providing an article support surface, a pair of detecting pins projecting upwardly through said surface and mounted for vertical movement relative to the surface, an electric control circuit, and a pair of switches in said circuit, each switch having an actuator arranged to be actuated by one of said pins incident to lowering movement of the pin under the urging of an article disposed on said support surface.

13. A device for detecting the orientation of an article comprising means providing an article support surface, a pair of detecting pins projecting upwardly through said surface and mounted for vertical movement relative to the surface, and control means responsive to the movement of at least one of said pins to a lowered position under the urging of a portion of an article resting thereon to perform a control operation on the article.

14. In an article detecting and rejecting system of the type wherein an article is carried on a support surface in a carrier and is manipulated and moved toward an oriented position, and wherein an article gripping mechanism removes the article from the carrier and conveys it to either a reject station or a feed station, the improvement which comprises a pair of spaced article detecting pins projecting upwardly through said carrier and mounted for vertical movement relative to the article support surface, an electric control circuit operatively connected to the article gripping mechanism and arranged when energized to actuate said mechanism to release an article at the reject station, and means responsive to the lowering of one of said pins under the urging of an article in said carrier for partially closing said circuit.

15. An article detecting device comprising means providing an article support surface, a pair of spaced article detecting abutment members projecting upwardly from said surface and arranged to be moved to a lowered position under the urging of an article resting thereon, a control circuit, two switches connected in parallel in said circuit, each switch having normally closed contacts in series with normally closed contacts of the other switch and normally open contacts in series with normally open contacts, of the other switch, means connecting each switch to one of said abutment members whereby when the member is lowered the normally closed contacts of the switch will be opened and the normally open contacts will be closed to prepare said circuit for energization through the normally closed contacts of the other switch.

16. A device for detecting the orientation of an article comprising, in combination, means providing an article support surface, and means including a plurality of spaced detecting members projecting above said article support surface to indicate the orientation of an article lying on said article support surface.

17. A device for detecting the orientation of an article comprising, in combination, means providing an article support surface, a plurality of spaced detecting members mounted for movement relative to and projecting above said article support surface, and means responsive to the movement of at least one of said members to indicate the orientation of an article lying on said article support surface.

18. A device for detecting and rejecting an improperly oriented article comprising, in combination, means providing an article support surface, a plurality of spaced detecting members mounted for movement relative to and projecting above said article support surface, each of said plurality of spaced detecting members being independently movable, and means including a control circuit responsive to the movement of any one of said members to actuate an article reject system to reject an improperly oriented article lying on said article support surface.

References Cited by the Examiner
UNITED STATES PATENTS

| | | | |
|---|---|---|---|
| 2,225,979 | 12/1940 | Carroll | 198—33 |
| 2,702,112 | 2/1955 | Hait | 198—33 |

SAMUEL F. COLEMAN, *Primary Examiner.*

WILLIAM B. LA BORDE, *Examiner.*